United States Patent
Hon

(10) Patent No.: US 9,610,995 B2
(45) Date of Patent: Apr. 4, 2017

(54) MOTORCYCLE PASSENGER BAR

(76) Inventor: Charlie Hon, Yorba Linda, CA (US)

( * ) Notice: Subject to any disclaimer, the term of this patent is extended or adjusted under 35 U.S.C. 154(b) by 0 days.

(21) Appl. No.: 13/296,021

(22) Filed: Nov. 14, 2011

(65) Prior Publication Data

US 2013/0119636 A1    May 16, 2013

(51) Int. Cl.
*B62J 27/00*    (2006.01)
*B62J 35/00*    (2006.01)

(52) U.S. Cl.
CPC .............. *B62J 27/00* (2013.01); *B62J 35/00* (2013.01)

(58) Field of Classification Search
CPC .................................. B62J 27/00; B62J 35/00
USPC ............................ 180/219; 280/304.5, 288.4
See application file for complete search history.

(56) References Cited

U.S. PATENT DOCUMENTS

| | | | | |
|---|---|---|---|---|
| 4,099,645 A | * | 7/1978 | Muth et al. | 220/304 |
| 5,002,149 A | * | 3/1991 | Watanabe et al. | 180/219 |
| 6,868,584 B2 | * | 3/2005 | Trottier | 16/421 |
| 6,896,279 B2 | * | 5/2005 | Galvagno | 280/304.5 |
| 7,182,359 B2 | * | 2/2007 | Galvagno | 280/288.4 |
| 7,651,112 B2 | * | 1/2010 | Ozawa | 280/304.5 |
| D621,299 S | * | 8/2010 | Longnecker | D12/7 |

* cited by examiner

*Primary Examiner* — Kevin Hurley
*Assistant Examiner* — Michael Stabley
(74) *Attorney, Agent, or Firm* — Steven Rinehart

(57) ABSTRACT

A passenger bar for motorcycles is disclosed. The passenger bar is affixed to the gas tank of a motorcycle forward of the motorcycle driver such that a passenger behind the motorcycle driver with arms wrapped around the driver may grip the passenger bar to secure himself/herself while the motorcycle is accelerating, decelerating, or experiences lateral forces. The passenger bar comprises a mounting plate, in one embodiment, and a handle inclined away from the mounting bracket.

2 Claims, 11 Drawing Sheets

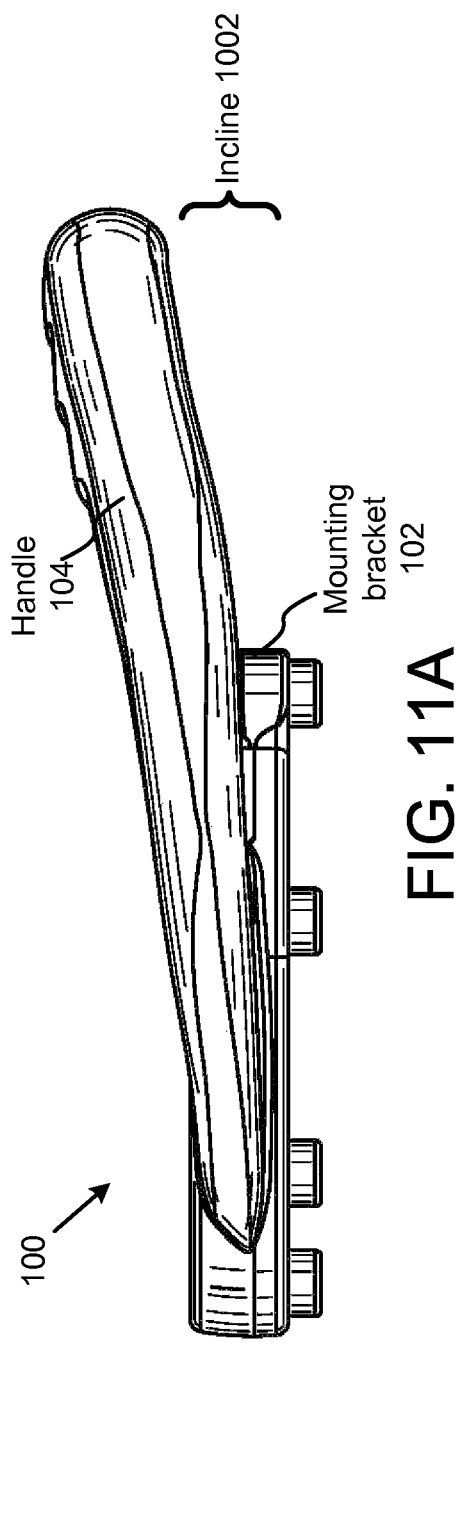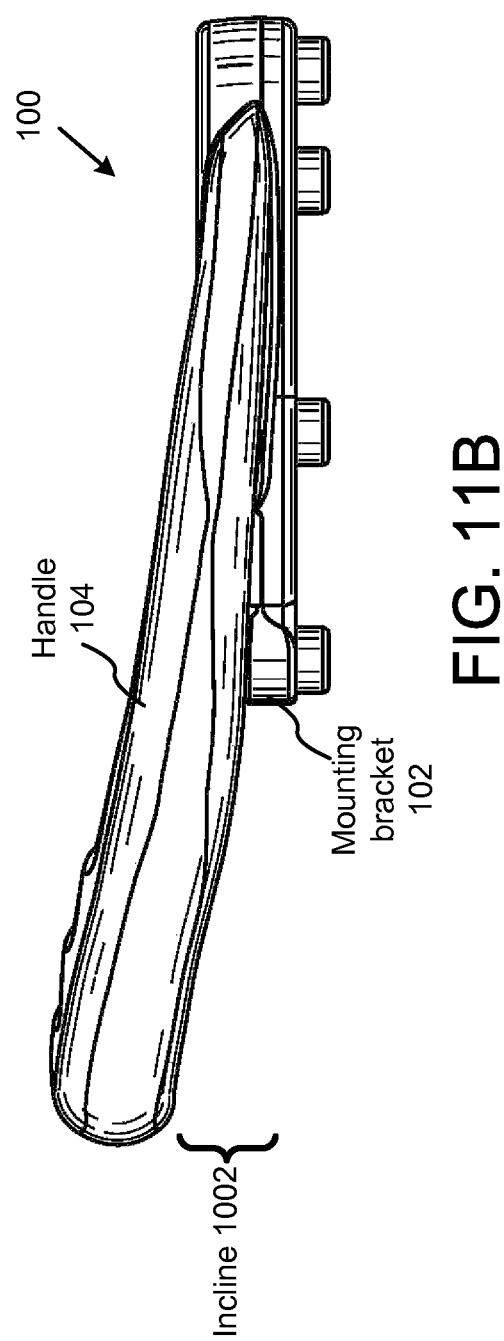

MOTORCYCLE PASSENGER BAR

BACKGROUND OF THE INVENTION

Field of the Invention

This invention relates to motorcycle accessories, and more particularly relates to passenger bars for affixation to motorcycle gas tanks.

Description of the Related Art

Motorcycle riders and passenger tend to slide forward on their seat into the gas tank and each other when a motorcycle brakes suddenly. Passengers behind motorcycle drivers are also particularly susceptible to sliding backward off the rear of the motorcycle when the motorcycle suddenly accelerates. Lateral sliding motion can be experienced by passengers when a motorcycle enters a curve at high velocities, or when the motorcycle rides over unavoidable potholes, or suddenly decelerates to avoid gravel. Riders of high performance or sport motorcycles are particularly prone to these forces.

Passengers desired handles, secured to the motorcycle, which they can grip to secure themselves during forceful motion of the motorcycle. There is no product on the market that is designed to provide effective passenger securement disposed forward of the motorcycle driver. Because passengers often wrap their arms around a driver's waist, a handle disposed forward of the driver is desirable and beneficial.

Most aftermarket motorcycle accessories that mount onto gas tanks do so using either integrated bungee cords or epoxy adhesives. These products are designed to protect the gas tank from scratching or some are designed as storage compartments.

There exists a need in the art for a simple and effective handle for motorcycle passenger disposed forward of the driver.

SUMMARY OF THE INVENTION

From the foregoing discussion, it should be apparent that a need exists for a improved motorcycle passenger bar. Beneficially, such a passenger bar would overcome many of the difficulties with prior art by providing a secure handle secured to the gas tank of a motorcycle.

The present invention has been developed in response to the present state of the art, and in particular, in response to the problems and needs in the art that have not yet been fully solved by currently available apparatii and methods. Accordingly, the present invention has been developed to provide a passenger bar for a motorcycle gas tank comprising: a semi-circular mounting bracket for attachment to a gas tank of motorcycle using a screw/bolt mechanism, wherein the mounting bracket partially circumscribes a gas fill access opening of the gas tank when attached; and a handle affixed to the mounting bracket, the handle inclined upward from the mounting bracket away from the gas tank, wherein the handle is for gripping a passenger on the motorcycle.

The passenger bar may further comprise an elastomeric sleeve partially enveloping the handle. The handle may be encapsulated by one of nylon, silastic gel, memory foam, and leather. The handle may comprise a rigid elastomeric material. In some embodiments, the handle comprises a flexible elastomeric material. The handle may be affixed at two points to the mounting bracket with bolts.

The handle may comprise a tubular alloy member. The passenger bar may further comprise a second handle affixed to the mounting bracket. The mounting bracket may fully circumscribe the gas fill access opening. In other embodiments, the handle comprises a rigid elastomeric material. The passenger bar may be manufactured as a single piece.

The mounting bracket may comprise an upper surface and a lower surface, wherein the lower surfaces sits flush against the gas tank. The passenger bar may further comprise a plurality of hollow cylindrical protrusions affixed orthogonally to the lower surface of the mounting bracket for engaging cylindrical recesses circumscribing the gas fill opening of the gas tank, the cylindrical protrusions defining hollow channels for partially housing bolts used to secure the mounting bracket to the gas tank.

A second passenger bar for a motorcycle gas tank is disclosed comprising: a semi-circular mounting bracket for attachment to a gas tank of motorcycle using a screw/bolt mechanism, wherein the mounting bracket partially circumscribes a gas fill access opening of the gas tank when attached; and a handle hingedly affixed at two points to the mounting bracket such that the handle can be lifted up-and-down by a passenger on the motorcycle while the mounting bracket is attached; and an elastomeric sleeve partially enveloping the handle.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11A is a side perspective view of a motorcycle passenger bar in accordance with the present invention; and FIG. 11B is a side perspective view of a motorcycle passenger bar in accordance with the present invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
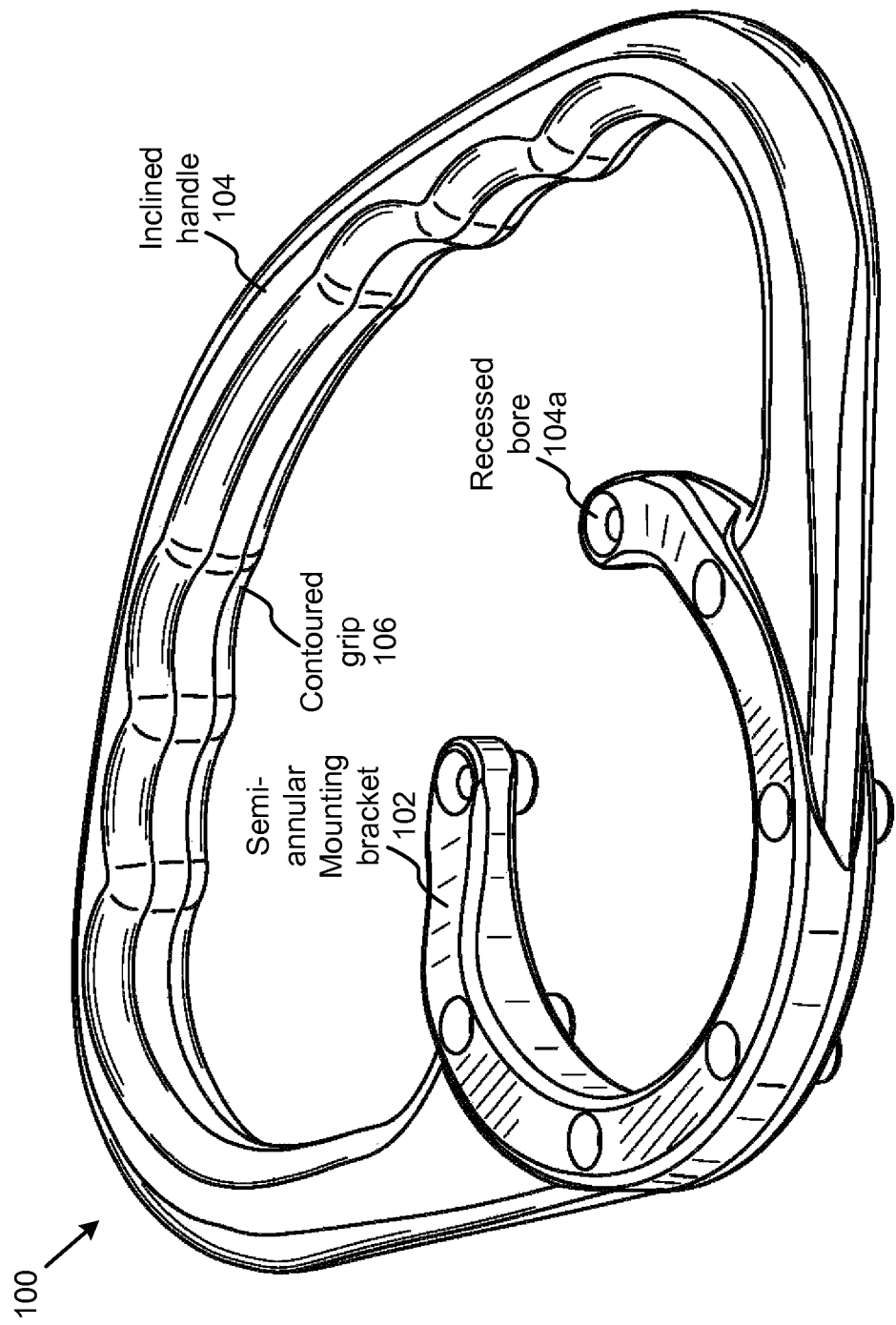
FIG. 1 is a side elevational perspective view of a motorcycle passenger bar in accordance with the present invention.

FIG. 1 is a side elevational perspective view of a motorcycle passenger bar 100 in accordance with the present invention. The motorcycle passenger bar 100 comprises a semi-annular mounting bracket 102, a recessed bore 104a, an inclined handle 104, and a contoured grip 106.

In the shown embodiment, both the handle 104 and the mounting bracket 102 may be made from one a rigid polymer, metal, alloy, wood, glass, elastomeric, or silastic material. The passenger bar 100 comprises a single manufactured piece in the shown embodiment. In various embodiments of the present invention, the mounting bracket 102 and/or the handle 102 comprise tubular, hollow members, while in other embodiments the mounting bracket 102 and/or the handle 102 comprise solid components formed using means known to those of skill in the art, including machining, milling, digital metal laser sintering (DMLS), and the like.

The mounting bracket 102, in the shown embodiment, comprises a semi-circular, or semi-annular, ring partially circumscribing the gas fill opening of a motorcycle gas tank. The trailing ends of the mounting bracket 102 may be tapered or declined toward the lower surface of the passenger bar 100 as shown as to allow clearance for the gas fill opening cap. The mounting bracket 102 is bolted to the gas tank using a screw/bolt mechanism as known to those of the skill in the art.

The mounting bracket 102 comprises an planar lower surface and a planar upper surface spaced apart from each other by the body of the mounting bracket 102. The mounting bracket 102 defines bolt holes 104a punched, or drilled, through the mounting bracket 102. These holes 104 may comprise beveled or recessed upper and lower edges.

The handle 104 is affixed laterally to the sides of the mounting bracket 102. In some embodiments, the handle 104 is welded or bolted to the mounting bracket 102. In the preferred embodiment, the handle 104 is formed from a single piece with the mounting bracket 102.

The handle 104 comprises a U-shaped or horseshoe-shaped member as shown. The handle 104 may be said to comprise two lateral members affixed to the mounting bracket 104, the lateral sides affixed to and interconnecting a curved handle component.

The handle 104 comprises a non-planar inner surface. The inner surface of the handle 104 is contoured to form grooves for the fingers of a motorcycle passenger gripping the passenger bar 100. In the shown embodiment, the inner surface of the handle 104 comprises four grooves for fingers.

The handle 104 is inclined in the shown embodiment. In the shown embodiment, the handle rising at an incline away from the upper surface of the passenger bar 100. The handle may be inclined anywhere within the range of 1 to 90 degrees.

In some embodiments of the present invention, two handles 104 are affixed to the mounting bracket 102. In other embodiments, the mounting bracket 102 comprises a full-annular ring, or circular ring, full circumscribing the gas fill opening.

Figure 2:
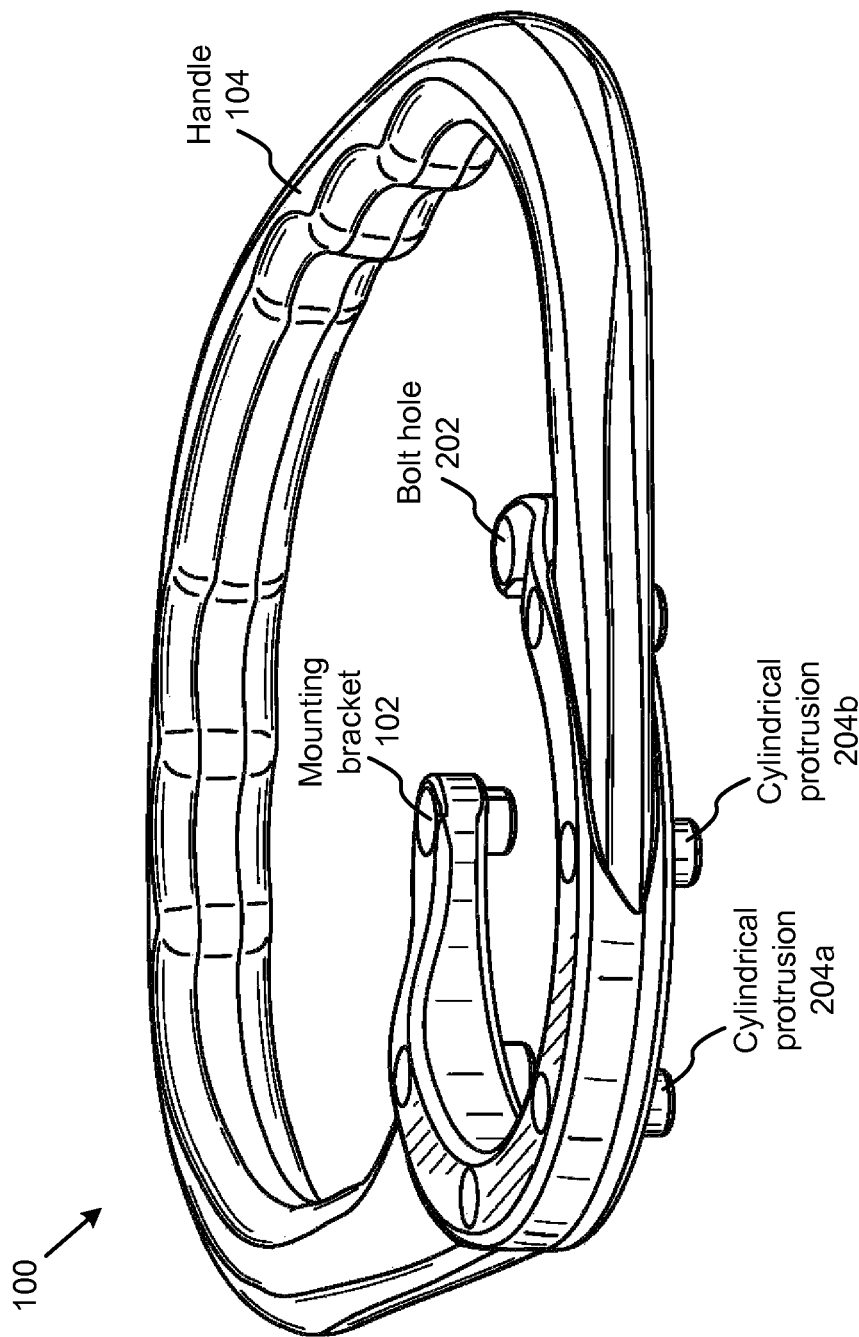
FIG. 2 is a side elevational perspective view of a motorcycle passenger bar in accordance with the present invention.

FIG. 2 is a side elevational perspective view of a motorcycle passenger bar 100 in accordance with the present invention. The motorcycle passenger bar 100 comprises a semi-annular mounting bracket 102, a bolt hole 202, a handle 104, and cylindrical protrusions 204a-b.

The mounting bracket 102 and handle 104 are substantially described above in relation to FIG. 1.

The passenger bar 100 comprises a plurality of hollow cylindrical protrusions 204a-b jutting orthogonally downward from the lower surface of the passenger bar 100. In some embodiments, the passenger does not comprise or consist of the cylindrical protrusions 204a-b.

Figure 3:
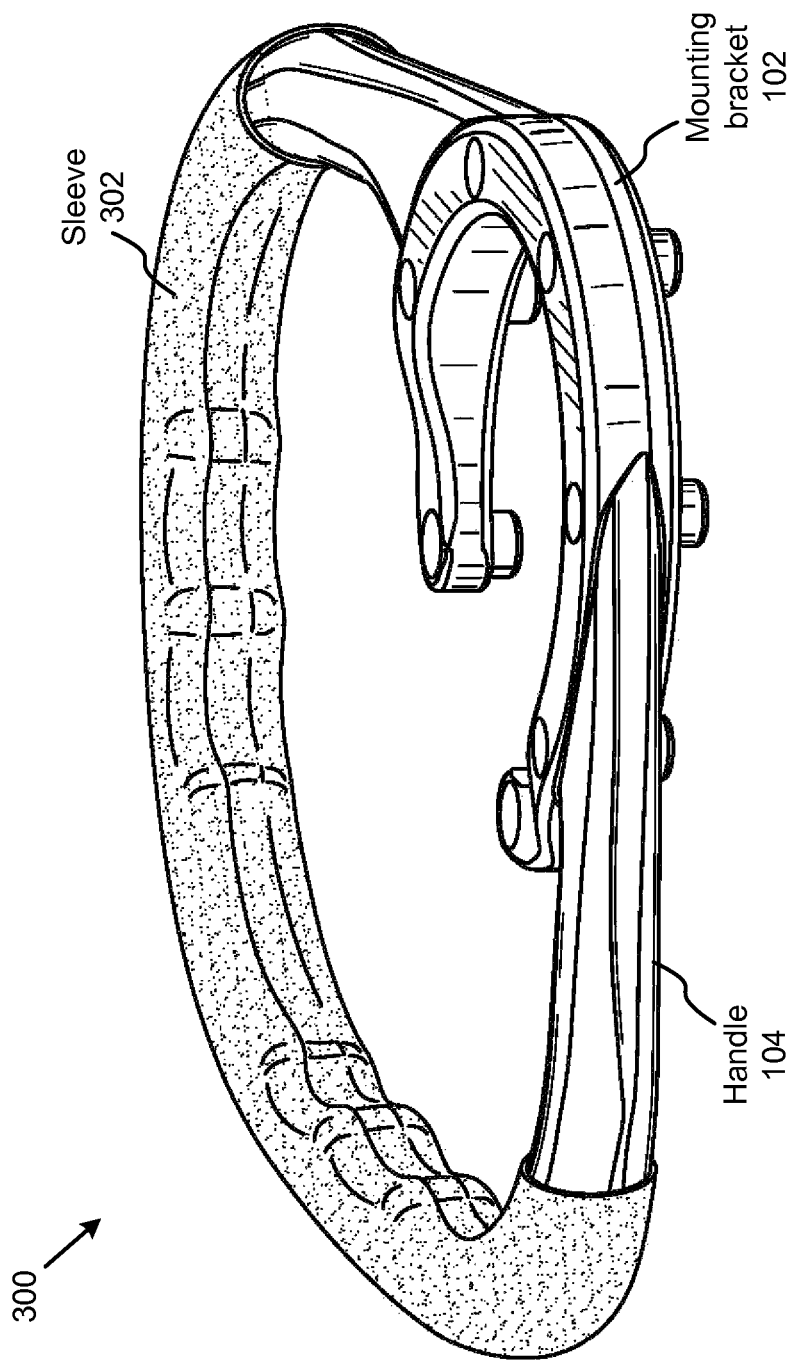
FIG. 3 is a side elevational perspective view of a motorcycle passenger bar in accordance with the present invention.

FIG. 3 is a side elevational perspective view of a motorcycle passenger bar 300 in accordance with the present invention. The motorcycle passenger bar 300 comprises a mounting bracket 102, a handle 104, and a sleeve 302.

The mounting bracket 102 and handle 104 are substantially described above in relation to FIG. 1.

The sleeve 302 envelopes wholly or partially the handle 104. In some embodiments, the sleeve 302 wholly envelopes the entire passenger bar 300 including the mounting bracket 102.

The sleeve may comprise, or be formed, from any one of elastomeric material, silastic gel, memory foam, nylon, or any other padding material known to those of the skill in the art. In some embodiments, the sleeve 302 comprises an inflatable bladder, padding the passenger bar 300 with compressed air.

Figure 4:
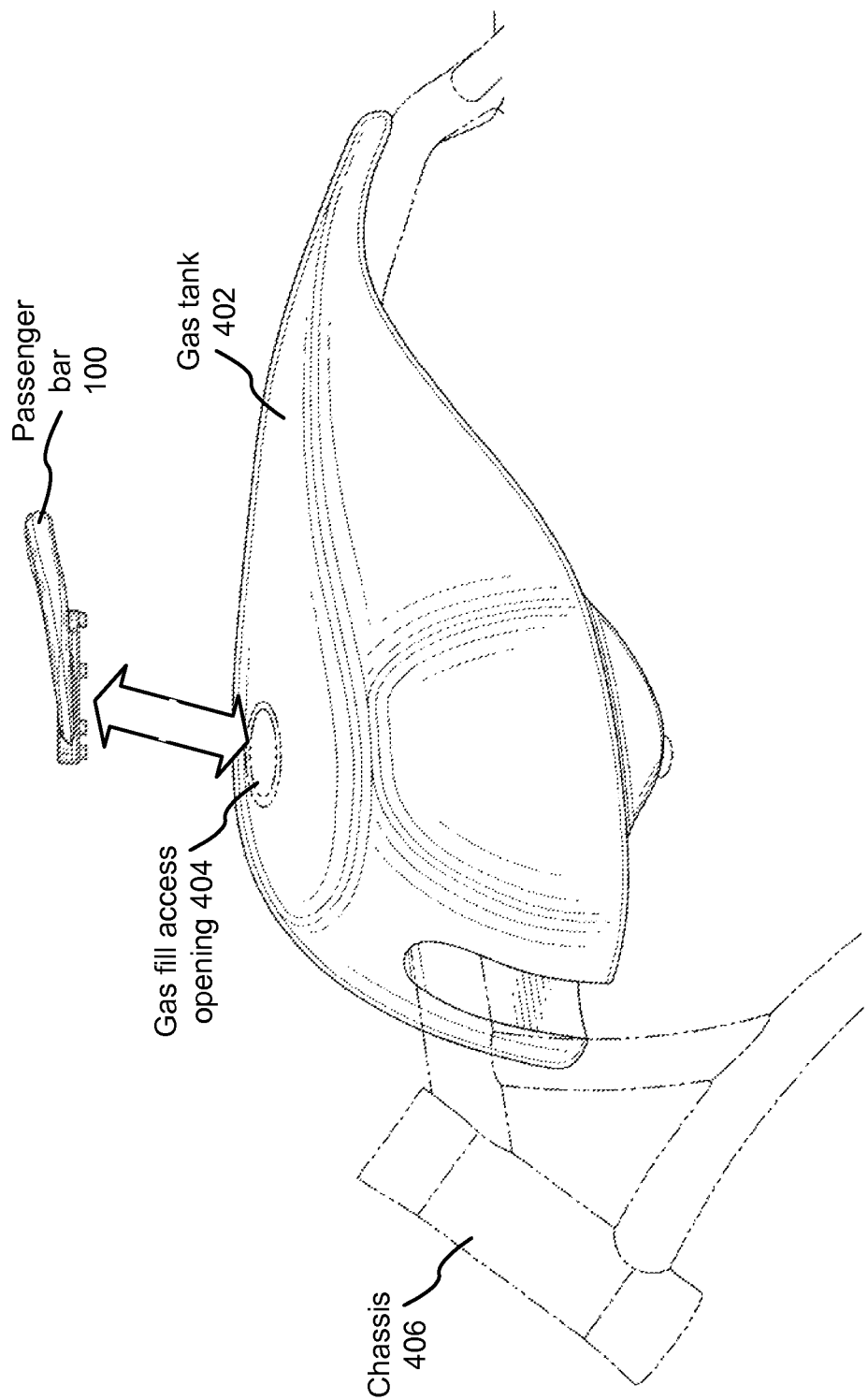
FIG. 4 is an environmental perspective view of a motorcycle passenger bar and a gas tank in accordance with the present invention.

FIG. 4 is an environmental perspective view of a motorcycle passenger bar 100 and a gas tank 402 in accordance with the present invention. The motorcycle passenger bar 100 comprises a mounting bracket 102, a handle 104, and a cylindrical protrusion 204.

The mounting bracket 102 and handle 104 are substantially described above in relation to FIGS. 1-3.

FIG. 4 shows the passenger bar 100 from a lower perspective. The cylindrical protrusion 204, as shown, may comprise recessed, or beveled, distal ends.

The passenger bar 100 is affixed such that the mounting bracket 102 circumscribes the gas fill opening 404.

The gas tank 402 is mounted on a chassis 406. Although a "cruiser" style gas tank is shown environmentally in FIG. 4, the present invention is beneficial across the spectrum of motorcycle gas tanks of all sizes and styles, particularly streamlined, racing-designed motorcycle gas tanks found on higher performance motorcycles commonly called bullet bikes.

Figure 5:
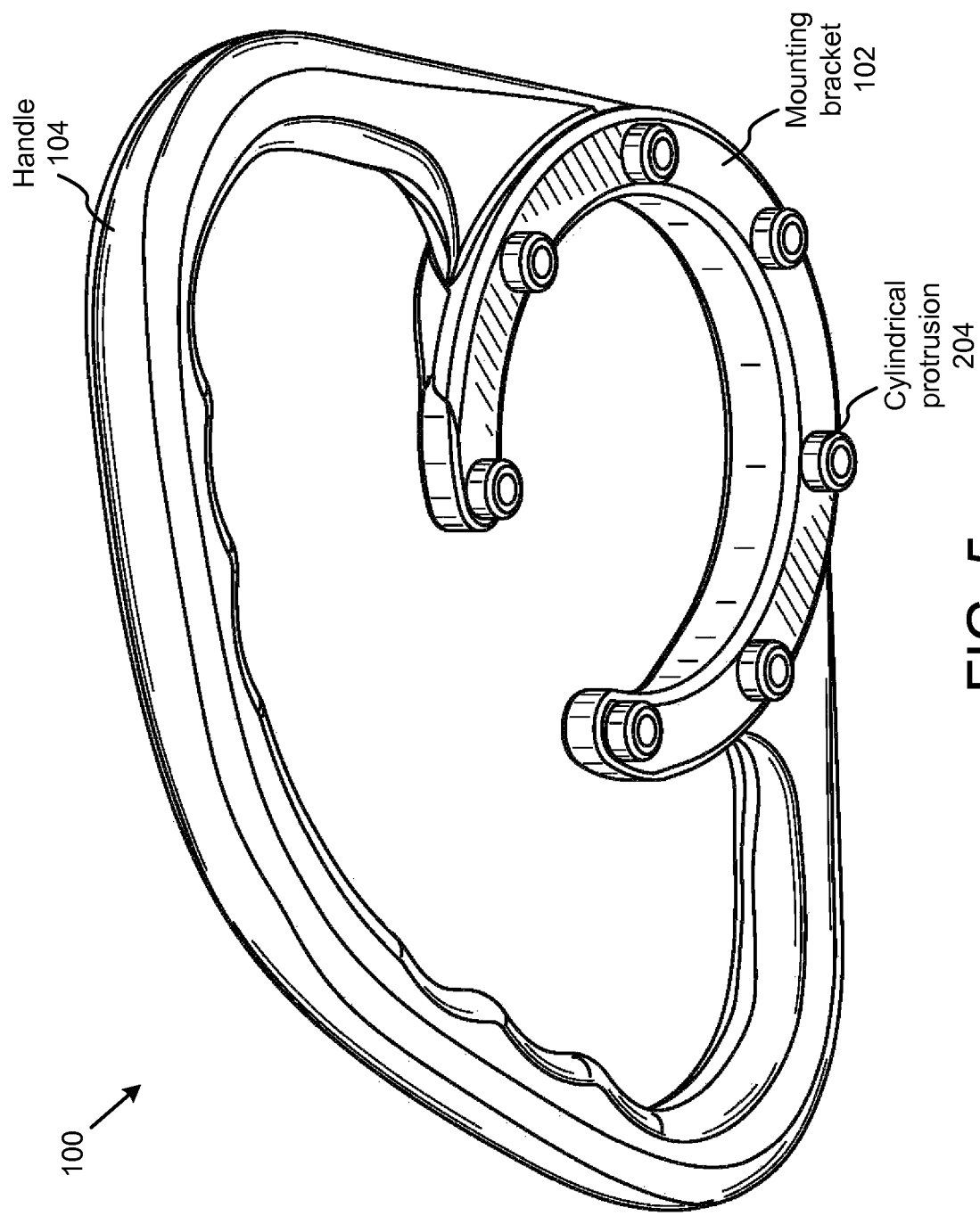
FIG. 5 is a lower side perspective view of a motorcycle passenger bar in accordance with the present invention.

FIG. 5 is a lower side perspective view of a motorcycle passenger bar 100 in accordance with the present invention.

The motorcycle passenger bar 100 comprises a mounting bracket 102, a handle 104, and a cylindrical protrusion 204. The mounting bracket 102 and handle 104 are substantially described above in relation to FIGS. 1-4. FIG. 5 shows the passenger bar 100 from a lower side perspective.

Figure 6:
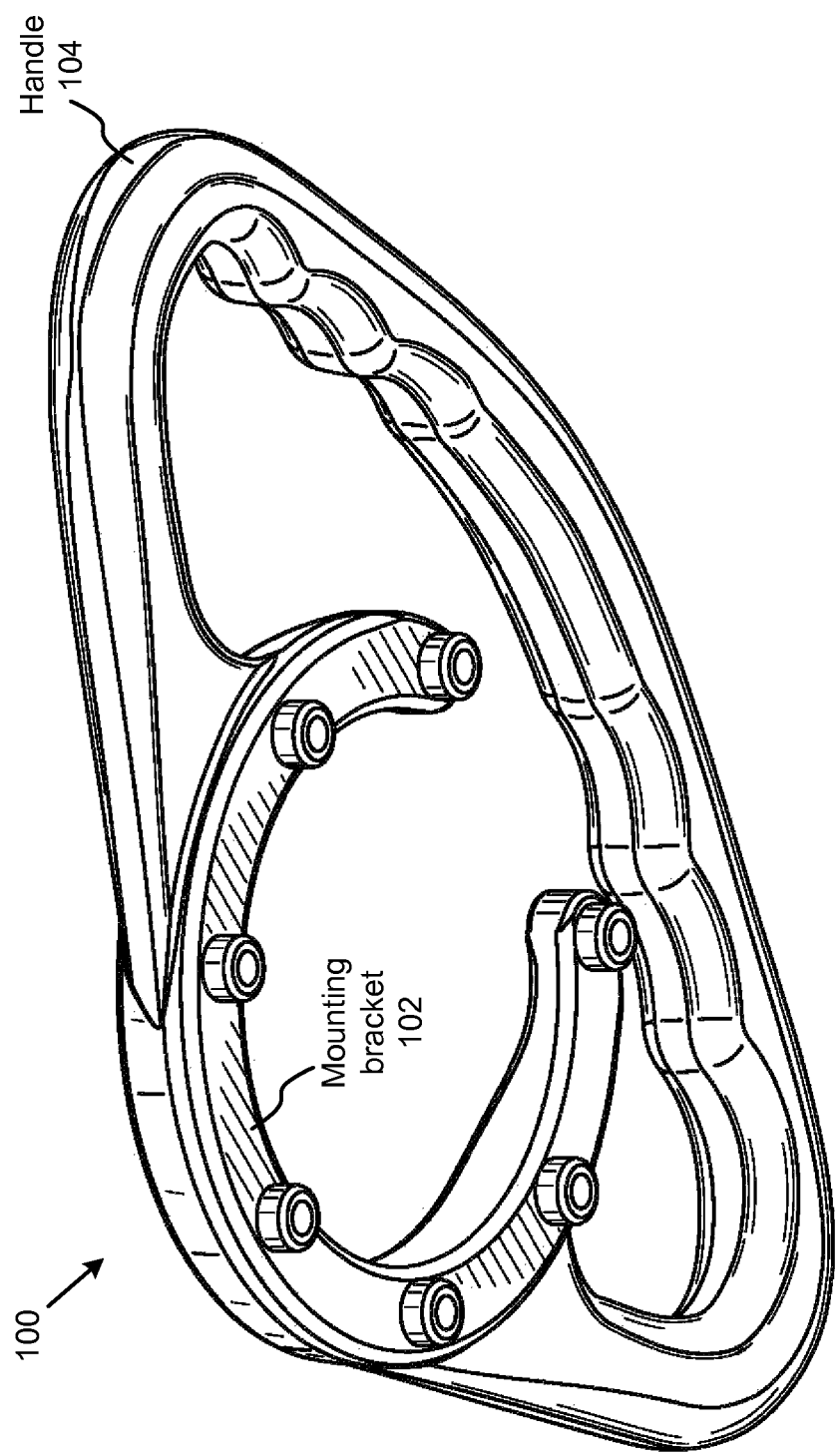
FIG. 6 is a lower side perspective view of a motorcycle passenger bar in accordance with the present invention.

FIG. 6 is a lower side perspective view of a motorcycle passenger bar 100 in accordance with the present invention. The motorcycle passenger bar 100 comprises a mounting bracket 102, and a handle 104. The mounting bracket 102 and handle 104 are substantially described above in relation to FIGS. 1-5. FIG. 6 shows the passenger bar 100 from a lower side perspective.

Figure 7:
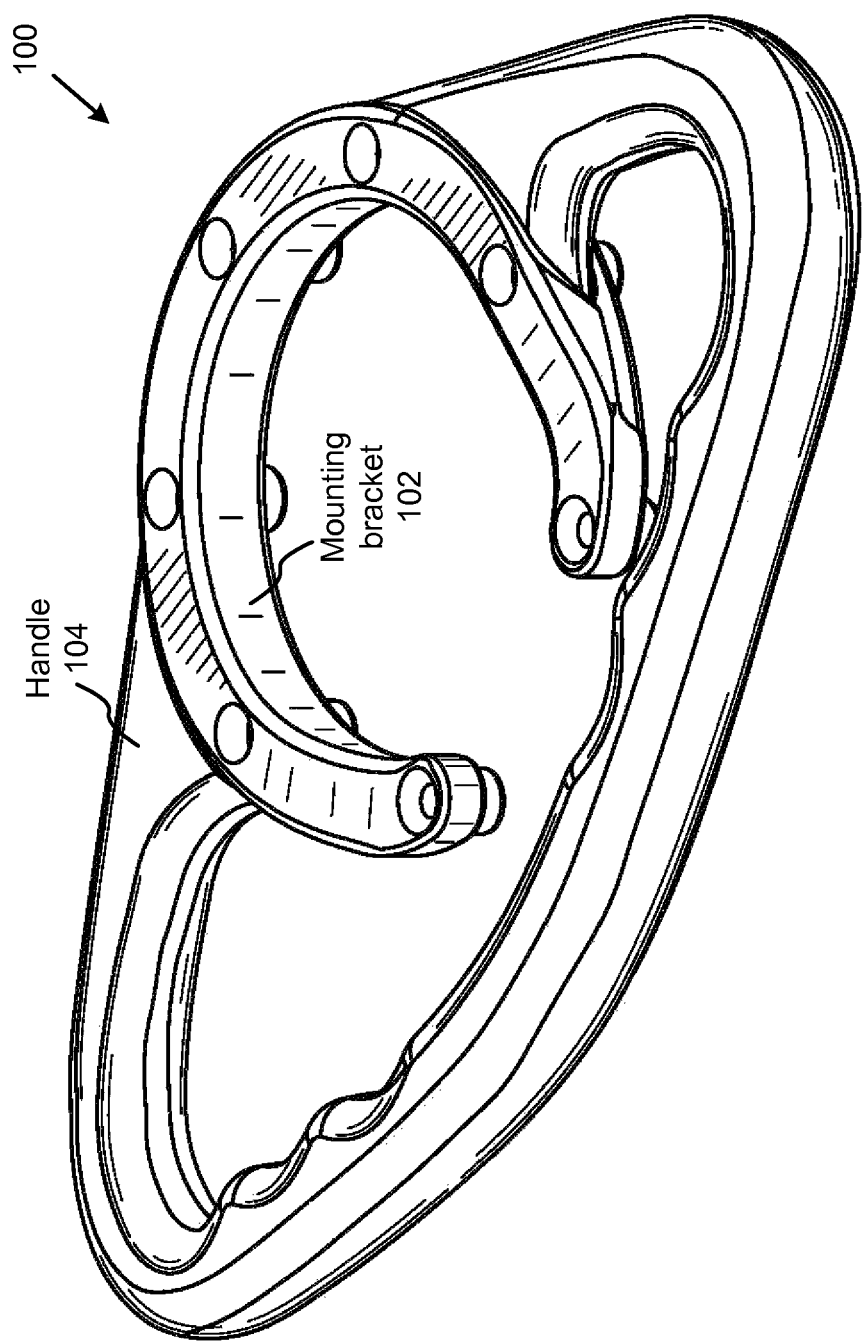
FIG. 7 is a rear elevational side perspective view of a motorcycle passenger bar in accordance with the present invention.

FIG. 7 is a rear elevational side perspective view of a motorcycle passenger bar 100 in accordance with the present invention. The motorcycle passenger bar 100 comprises a mounting bracket 102, and a handle 104. The mounting bracket 102 and handle 104 are substantially described above in relation to FIGS. 1-6. FIG. 7 shows the passenger bar 100 from an upper-side perspective.

Figure 8:
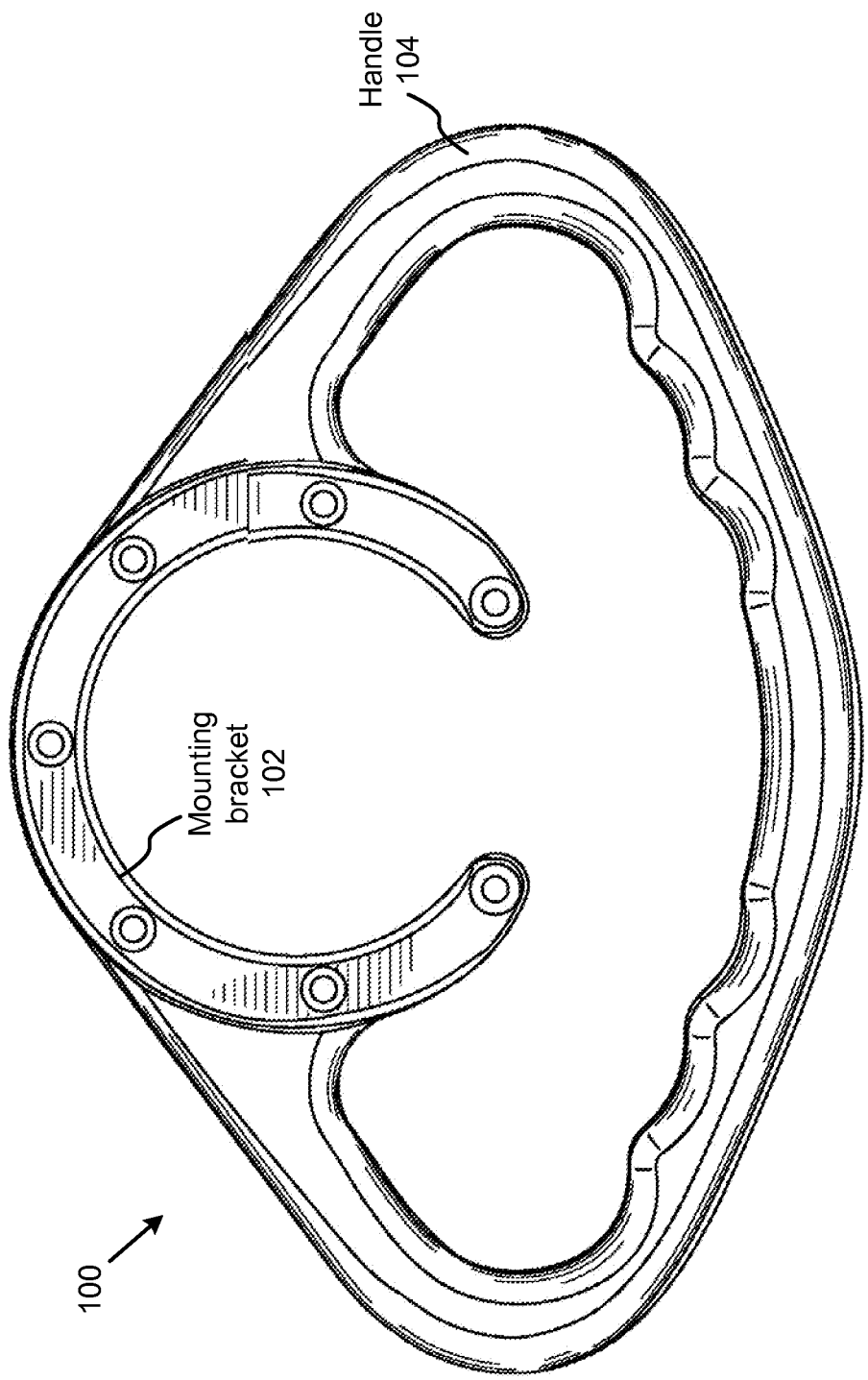
FIG. 8 is a lower perspective view of a motorcycle passenger bar in accordance with the present invention.

FIG. 8 is a lower perspective view of a motorcycle passenger bar in accordance with the present invention. The motorcycle passenger bar 100 comprises a mounting bracket 102, and a handle 104. The mounting bracket 102 and handle 104 are substantially described above in relation to FIGS. 1-7. FIG. 8 shows the passenger bar 100 from a lower perspective.

Figure 9:
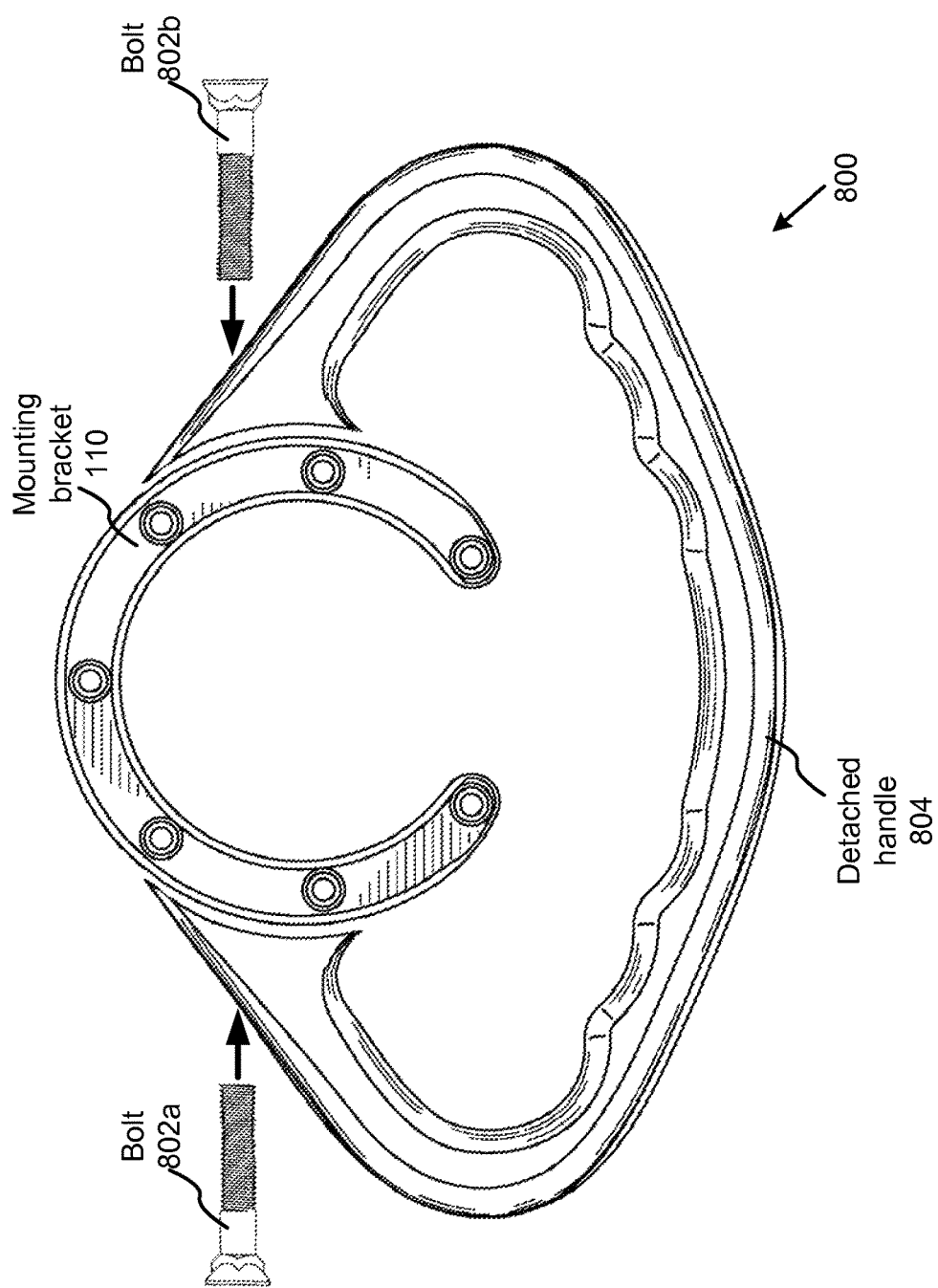
FIG. 9 is a lower perspective view of a motorcycle passenger bar in accordance with the present invention.

FIG. 9 is a lower perspective view of a motorcycle passenger bar 800 in accordance with the present invention. The motorcycle passenger bar 800 comprises a mounting bracket 102, bolts 802a-b, and a detached handle 804. The mounting bracket 102 is described above in relation to FIGS. 1-7.

The passenger bar 800 differs from the passenger bar 100 only in that the detached handle 804 replaces the handle 104, and the detached handle 804 is hingedly affixed with bolts 204a-b to the mounting bracket 102.

As shown, the partially threaded bolts 802a-b traverse the lateral sides of the handle 804 and secure the handle 804 to the mounting bracket 102 such that the handle 804 may rise when pulled up by a motorcycle passenger. The handle 804 may rotate axially around the bolts 802a-b when they are screwably attached to the mounting bracket 102.

Figure 10A:
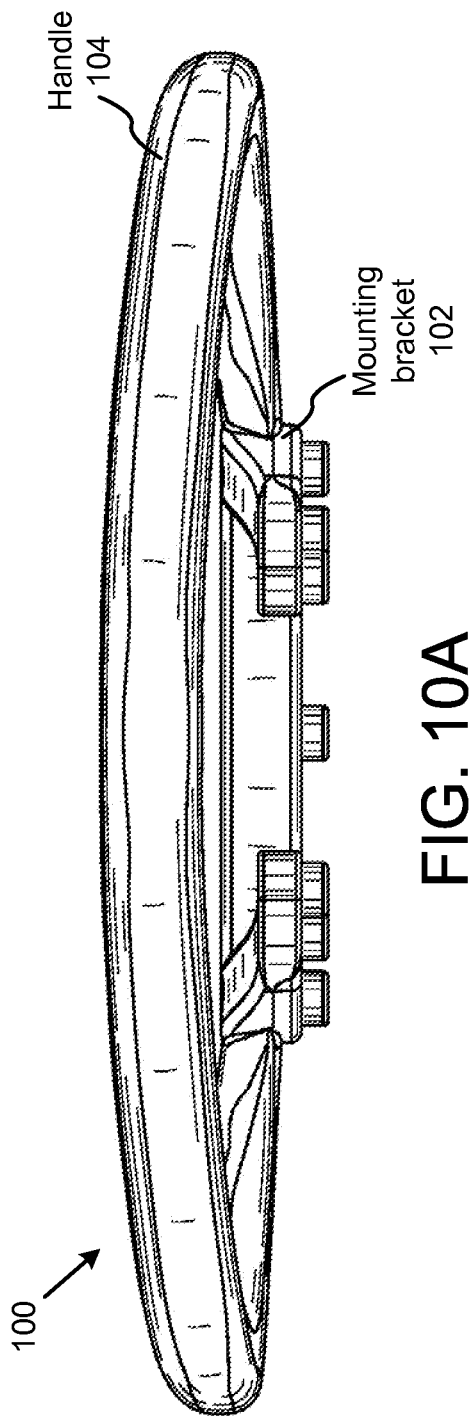
FIG. 10A is a rear perspective view of a motorcycle passenger bar in accordance with the present invention.

FIG. 10A is a rear perspective view of a motorcycle passenger bar 100 in accordance with the present invention. The motorcycle passenger bar 100 comprises a mounting bracket 102 and a handle 104. The mounting bracket 102 and handle 104 are described above in relation to FIGS. 1-9.

Figure 10B:
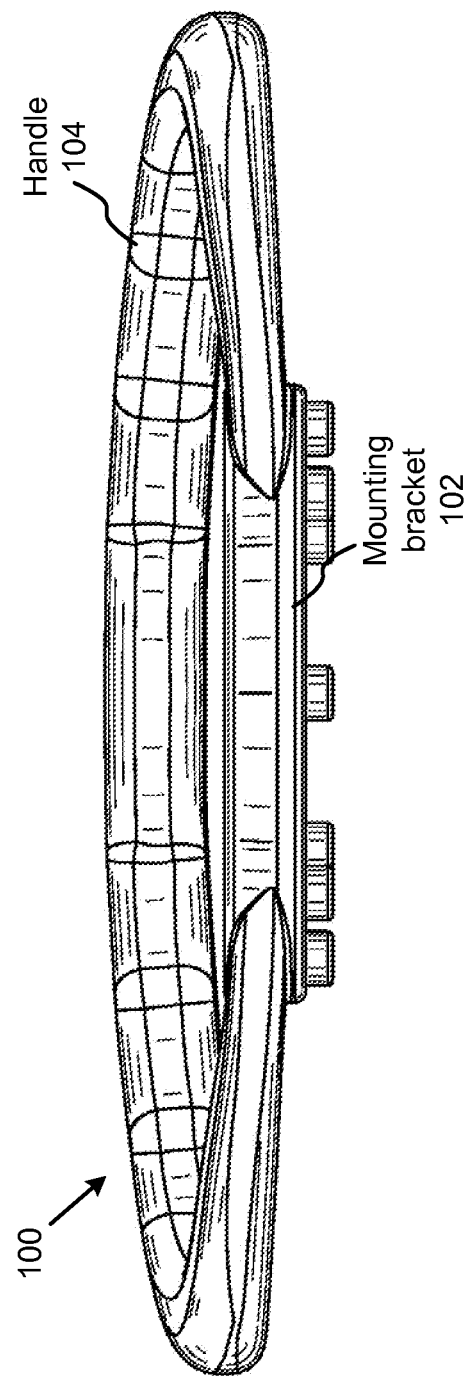
FIG. 10B is a forward perspective view of a motorcycle passenger bar in accordance with the present invention.

FIG. 10B is a forward perspective view of a motorcycle passenger bar 100 in accordance with the present invention. The motorcycle passenger bar 100 comprises a mounting bracket 102 and a handle 104. The mounting bracket 102 and handle 104 are described above in relation to FIGS. 1-10A.

FIG. 11A is a side perspective view of a motorcycle passenger bar 100 in accordance with the present invention. The motorcycle passenger bar 100 comprises a mounting bracket 102 and a handle 104. The mounting bracket 102 and handle 104 are described above in relation to FIGS. 1-10B.

As discussed above, the handle 104 is inclined away from the upper surface of the mounting bracket 102 by a inclined distance 1002. In some embodiments, the lateral sides of the handle 104 are curved upward away from the mounting bracket 102.

FIG. 11B is a side perspective view of a motorcycle passenger bar 100 in accordance with the present invention. The motorcycle passenger bar 100 comprises a mounting bracket 102 and a handle 104. The mounting bracket 102 and handle 104 are described above in relation to FIGS. 1-11A. The handle 104 is inclined upward by an incline distance 1002 predetermined by the passenger bar 100 manufacturer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A passenger bar for a motorcycle gas tank comprising:
   a semi-circular mounting bracket for attachment to a gas tank of a motorcycle using a screw/bolt mechanism, wherein the mounting bracket partially circumscribes a gas fill access opening of the gas tank when attached; and
   a handle hingedly affixed to the mounting bracket with two bolts traversing lateral sides of the handle, the handle inclined upward from the mounting bracket away from the gas tank, wherein the handle is for gripping by a passenger on the motorcycle;
   wherein the mounting bracket comprises an upper surface and lower surface, wherein the lower surface sits flush against the gas tank;
   a plurality of hollow cylindrical protrusions affixed orthogonally to the lower surface of the mounting bracket for engaging cylindrical recesses circumscribing the gas fill opening of the gas tank, the cylindrical protrusions defining hollow channels for partially housing bolts used to secure the mounting bracket to the gas tank; and
   wherein the handle is contoured to form grooves for fingers of the passenger.

2. A passenger bar for a motorcycle gas tank comprising:
   a semi-circular mounting bracket for attachment to a gas tank of a motorcycle using a screw/bolt mechanism, wherein the mounting bracket partially circumscribes a gas fill access opening of the gas tank when attached; and
   a handle affixed to the mounting bracket, the handle inclined upward from the mounting bracket away from the gas tank, wherein the handle is for gripping by a passenger on the motorcycle;
   wherein the mounting bracket comprises an upper surface and lower surface, wherein the lower surfaces sit flush against the gas tank;
   a plurality of hollow cylindrical protrusions affixed orthogonally to the lower surface of the mounting bracket for engaging cylindrical recesses circumscribing the gas fill opening of the gas tank, the cylindrical protrusions defining hollow channels for partially housing bolts used to secure the mounting bracket to the gas tank.

* * * * *